June 23, 1931.  J. B. McFERRAN, JR  1,811,240
PRESSURE LUBRICATING SYSTEM
Filed Sept. 15, 1928
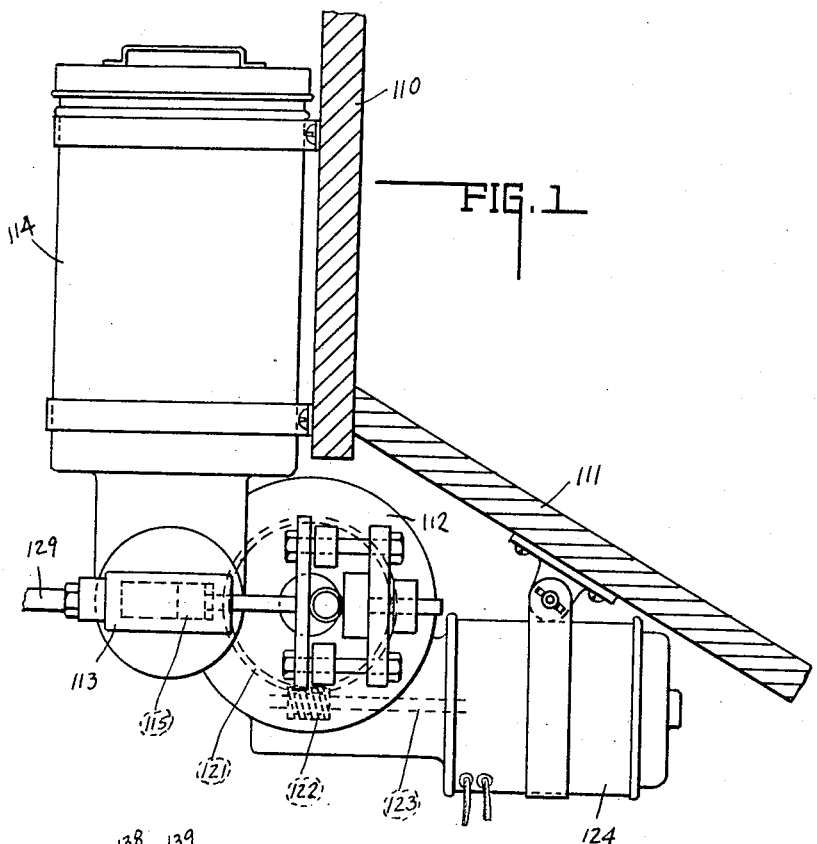
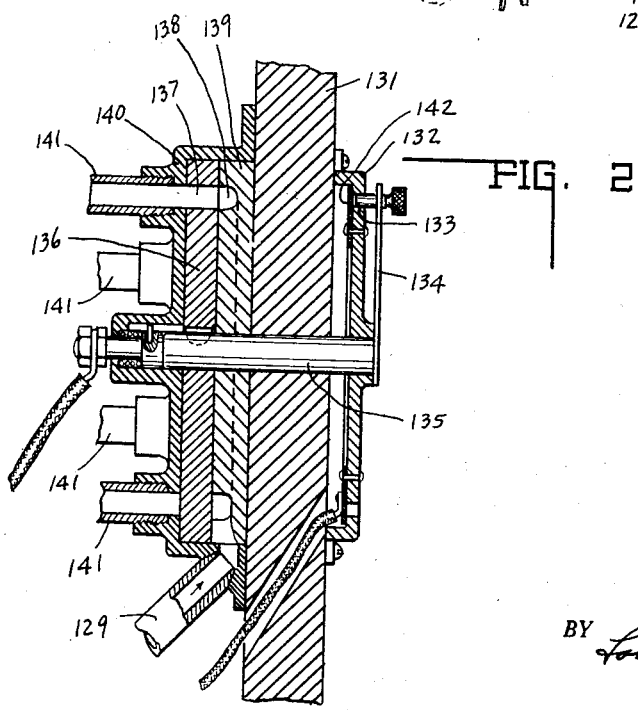
INVENTOR.
JOHN B. McFERRAN, JR.
BY
ATTORNEYS.

Patented June 23, 1931

1,811,240

UNITED STATES PATENT OFFICE

JOHN B. McFERRAN, JR., OF LOUISVILLE, KENTUCKY, ASSIGNOR TO LOUISVILLE ELECTRIC MANUFACTURING COMPANY, OF LOUISVILLE, KENTUCKY, A CORPORATION

PRESSURE LUBRICATING SYSTEM

Application filed September 15, 1928. Serial No. 306,274.

This invention relates to a pressure lubricating system particularly adaptable for vehicles, and the lubrication of the various chassis connections therein under pressure.

The invention further resides in the mounting of a grease gun on the vehicle which is permanently connected with the various parts of the chassis to be lubricated.

The principal object of the invention is to provide a grease gun adapted to selectively force grease or other lubricating substance through suitable connections to the parts to be greased, while permitting the convenient manipulation and control thereof so as to simultaneously actuate the gun and open the check valve to the part to be lubricated.

The full nature of the invention will be more fully understood from the accompanying drawings and the following description and claims.

Fig. 1 is a side elevation of the selective control valve mounted upon the vehicle dash board. Fig. 2 is a section taken through a portion of the instrument board showing the control switch and selective valve mechanism mounted thereon.

As shown in Figure 1 of the drawings, there is a front dash board 110 of the vehicle and the foot board 111. The receptacle 114 is secured to the dash board and the motor 124 is firmly secured to the bottom of the foot board. Intermediate the receptacle and motor there is a gear housing 112 in which the worm gear 121 is mounted for rotation, driven by the worm 122 which is mounted on the shaft 123 of the motor. The worm gear drives the piston 115 through the eccentric connected with the gear and crosshead frame. The lubricant contained in the receptacle 114 then drops by gravity into the cylinder 113 and is forced therefrom by the reciprocable action of the piston through the tube 129 into the valve housing 140 which is mounted on the rear of the dash board 131.

On the front of the dash board there is an indicating disk 132 provided with apertures 133 for receiving a projection on the handle 134. Said handle is secured to the shaft 135 extending rearwardly through the dash and connected with the annular valve disk 136 whereby said valve will be rotated by the rotation of the handle 134. Said disk is provided with a single passage-way 137 which registers with an annular groove 138 formed in the block 139 and communicating with the intake tube 129. Surrounding the rotatable selective valve disk 136 there is a housing 140 into which the various individual tubes 141 are connected, which lead to various parts of the vehicle. Thus, when the handle is positioned to engage a certain notch 133, the passage 137 will be caused to register with the distributing tube 141 opposite that notch leading to a predetermined part of the chassis.

For controlling the motor, the indicating disk 132 is provided with an annular contacting ring 142 with which the handle engages when extending through one of the apertures 133. The contacting ring 142 is electrically connected with one terminal of the motor by a cable extending through an aperture in the dash board 110. The other terminal of the motor is connected by a suitable cable directly with the shaft 135 from which electric contact may be made with the ring 142 through the medium of the handle 134, whereby the circuit through the motor may be completed for driving the same when the handle 134 is moved to a position so that the knob or projection on the end thereof will extend through one of the apertures 133 so as to contact with the ring 142. It will be noted that when said projection is brought to a position to extend through one of the apertures the valve disk is brought in position for opening the passage from the receptacle 114 to the corresponding selected lubricant delivery tube 141.

By means of this arrangement, by one operation or adjustment of the handle 134 a given part of the lubricant may be selected for lubrication while the power is simultaneously applied.

When the device is applied to the motor vehicle as a permanent installation and it is desired to lubricate a given part of the vehicle, the handle 134 is rotated so that the projection thereon extends through one of the apertures and contacts with the ring 142, thus energizing the motor and causing the lubricant to be pumped through the selected conduit leading thereto, said conduit communicating with the receptacle by reason of the selective positioning of the handle.

The invention claimed is:

1. The combination with a vehicle, of a power lubricator mounted thereon, said lubricator including a lubricant containing receptacle, a plurality of tubes connecting said receptacle with the individual parts of the vehicle to be lubricated, a valve mounted between said receptacle and tubes, power driven means for forcing lubricant from said chamber through said valve under pressure when said valve is in open position, and a handle for selectively positioning said valve for permitting the lubricant to be forced therethrough into one of said tubes while preventing lubricant from passing through the other tubes, and means controlled by the position of said valve for actuating said power driven means when said valve is in open position with respect to said selected tube.

2. The combination with a vehicle, of a power lubricator mounted thereon, means associated therewith for selectively lubricating individual parts of said vehicle, an electric motor, actuating mechanism driven by said motor for forcing the lubricant under pressure to such selected part to be lubricated, and a single control for effecting a channel of communication between said lubricator and said selected part to be lubricated and simultaneously energizing said motor.

3. The combination with a vehicle, of a power lubricator mounted thereon, including a lubricant containing chamber, a plurality of channels of communication with different parts of said vehicle to be lubricated, a common channel of communication therewith connected with said chamber, a control for selectively placing one of said first mentioned channels of communication in connection with said main channel of communication, a manipulating handle for actuating said control and indicating the selected channel of communication, an electric motor for forcing the lubricant through said channels of communication, and means associated with said handle for energizing said motor upon the selective positioning thereof.

4. The combination with a vehicle, of a lubricator mounted thereon, means associated therewith for selectively lubricating individual parts of said vehicle, actuating mechanism for forcing the lubricant under pressure to such selected part to be lubricated, and a single control for effecting a channel of communication between said lubricator and said selected part to be lubricated and simultaneously actuating said mechanism.

In witness whereof, I have hereunto affixed my signature.

JOHN B. McFERRAN, Jr.